Patented Sept. 28, 1954

2,690,454

UNITED STATES PATENT OFFICE 2,690,454

PREPARATION OF ACRYLAMIDES

Daniel E. Strain and Clarence D. Bell, Wilmington, Del., assignors to E. I. du Pont de Nemours & Company, Wilmington, Del., a corporation of Delaware No Drawing. Application October 29, 1948,
Serial No. 57,424

4 Claims. (Cl. 260—561)

This invention relates to a process for the preparation of unsaturated organic amides, and more particularly relates to the recovery of acrylamide and methacrylamide from a solution of reaction products obtained by unsaturating and amidating cyanhydrins.

It is known that methacrylamide can be produced by treating acetone cyanhydrin with sulfuric acid at temperatures from 90 to 140° C., although isolation of the methacrylamide from the reaction mixture involves slow and uneconomical procedures. Various methods have been proposed for effecting the separation, for instance by dissolving the whole reaction mass in water followed by neutralization with an alkaline earth metal hydroxide or carbonate. The mixture is then filtered to remove the insoluble sulfate and the aqueous solution evaporated to obtain a residue consisting mainly of methacrylamide. The crude residue is then recrystallized to give a substantially pure product. In another method the acetone cyanhydrin sulfuric acid product is heated to a temperature below 90° C., and the saturated sulfuric acid monoester of alpha-hydroxy, alpha-methylpropionamide produced is treated to give an ammonium salt of the mono-sulfuric acid saturated ester, which ester is then heated at sufficient temperature to decompose the ammonium salt and simultaneously form methacrylamide and ammonium bisulfate.

An object of the present invention is to provide a new and improved method for recovering acrylamide and methacrylamide from reaction mixtures obtained from acetaldehyde cyanhydrin and acetone cyanhydrin sulfuric acid reaction products. Another object is to provide a process for neutralizing the mono-sulfuric acid ester of alpha-methacrylamide with ammonia in an organic solvent. A further object is to provide a recovery process in which the acrylamide and methacrylamide can be separated from involved reaction products by solution in a water-immiscible organic solvent. Other objects and advantages of the invention will hereinafter appear.

According to the present invention, unsaturated amides, and especially acrylamide and methacrylamide, are produced by heating a mixture of an aldehyde cyanhydrin or ketone cyanhydrin with concentrated sulfuric acid or an alkyl sulfuric acid or mixtures thereof to a sufficient temperature to form the unsaturated amide sulfate. This product is then neutralized with anhydrous ammonia or other suitable base in a water immiscible organic solvent which is a non-solvent for ammonium sulfate. The ammonium sulfate precipitate is filtered off and the unsaturated amide recovered from the organic solvent by extracting the amide from solution by washing, scrubbing or otherwise dissolving the amide out of the organic solvent. The ammonium sulfate precipitate is separated from the small amount of hydrocarbon present by solution in water, the hydrocarbon being removed by decantation.

The reactions proceed in accord with these theoretical equations:

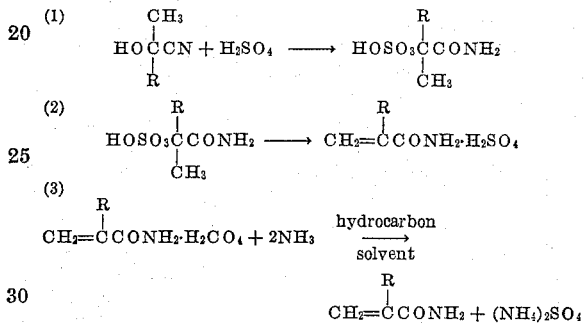

For the preparation of methacrylamide the reactions occur in accord with these theoretical equations:

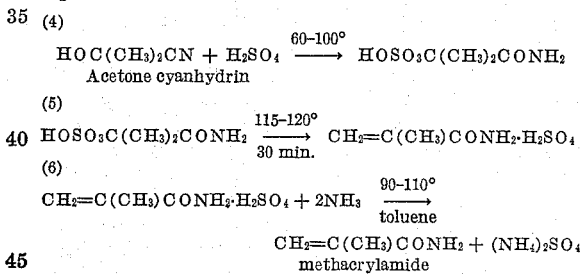

The basic process for preparing the unsaturated acids and corresponding amides is disclosed in U. S. patents of Hill and Crawford et al., U. S. 2,026,894, 2,101,821, 2,101,822 and 2,140,469.

The acrylamide is prepared by treating acetaldehyde cyanhydrin with concentrated sulfuric acid under similar conditions to form the monosulfuric acid salt of acrylamide.

The neutralization step is conducted with substantially anhydrous ammonia, the ammonia, preferably as a gas, being introduced into the unsaturated amide sulfate until no more ammonia is absorbed. This step is conducted in an organic solvent in which ammonium sulfate is insoluble and when the neutralization has been completed the ammonium sulfate may be removed from the neutralized reaction mixture by filtration or centrifugal separation.

The organic solvents used for providing the medium in which the neutralization step is conducted include those which are non-solvents of ammonium sulfate and water and are solvents of the unsaturated amides. Examples of these solvents include benzene, toluene, xylol, xylene, the more volatile petroleum hydrocarbons such as petroleum ether, solvent naphtha and gasoline.

In accord with one feature of the invention the unsaturated amide is separated from solution in the organic solvent by extraction with an aqueous extracting agent. Prior to extracting with such an agent precautions should be taken to first insure that the solvent solution of the unsaturated amide is neutral. Substantial neutrality can be assured by causing any free ammonia to be evaporated. When this stage has been attained, the unsaturated amide can be extracted with water or with water containing a conditioning agent such as an aldehyde, e. g. formaldehyde, acetaldehyde or the like—in the latter case, the extracted amide is immediately available for conversion to alkylol substituted acrylamides and methacrylamides.

The examples illustrate preferred embodiments of the invention in which parts are by weight unless otherwise indicated:

*Example 1.*—Redistilled acetone cyanhydrin (34 g., 0.2 M) is added to a mixture of 0.4 g. cupric sulfate and 54.9 g. 99.75% sulfuric acid at 30–191° during twenty-two minutes, and the resulting mixture heated for thirty minutes at 115–120° C. The product is then dropped into a stirred flask containing 200 cc. of toluene at 90° during twelve minutes, in the presence of a continuous stream of ammonia. The mixture maintains itself at a temperature of 90° for most of the next hour. When the exothermic reaction is over the mixture is filtered through a steam-jacketed Büchner funnel to remove the ammonium sulfate. The solid is extracted with two more 200 cc. portions of boiling toluene, with stirring. Thereafter the filtrate is thoroughly mixed with water for the extraction of the methacrylamide and the methacrylamide is crystallized from the water to give an excellent yield of the amide from acetone cyanhydrin.

*Example 2.*—Redistilled acetone cyanhydrin (34 g.) is added to a stirred mixture of 99.75% $H_2SO_4$ (57.8 g.) and $CuSO_4$ (0.4 g.) during nineteen minutes; when one-third of the cyanhydrin has been added, the temperature is about 90° C.; the maximum temperature about 98° C. The resultant mixture is stirred at 111–115° C. for thirty minutes and then dropped while still warm into a stirred flask containing 250 cc. xylene, into which a stream of ammonia is passed. The addition of the acidic mixture at 35–70° requires about nineteen minutes; heat continues to be evolved for another thirty minutes, a temperature of 100° being reached without external heat. The product is heated to 135° and filtered through a steam-jacketed Büchner funnel. The solid is extracted twice more with 160–200 cc. portions of xylene, with stirring at reflux temperature. The xylene solution is extracted with water at or about room temperature and the water extract treated for the crystallization of the methacrylamide.

*Example 3.*—Acetone cyanhydrin (68 g.) is added to 99.75% $H_2SO_4$ (109.8 g.) during one hour at 32–100° C. The product is stirred at 112–120° C. for thirty minutes. The resultant mixture is dropped during sixteen minutes into 150 g. of solvent naphtha, stirred at 75° C. in a flask into which a stream of ammonia is passed. The mixture is maintained at 75° C. or below for two hours and then filtered through a Büchner funnel. The solid is heated and stirred with an additional 250 cc. of solvent naphtha and filtered again, then extracted with water to remove the methacrylamide which, if desired, may be recovered from the water by crystallization.

*Example 4.*—The process of Examples 1, 2 and 3 are repeated using in place of water an aqueous aldehyde solution such as a 20% aqueous solution of formaldehyde, a 37% aqueous solution of formaldehyde, and a 20% aqueous solution of acetaldehyde, respectively.

Inasmuch as there is a tendency for the methacrylamide to polymerize during its separation, a water insoluble polymerization inhibitor may be used such, for example, as diphenyl paraphenylene diamine, benzoquinone, anthracene, nitrobenzene, and similar well known inheibitors of vonyl ester polymerization.

We claim:

1. In a method of preparing methacrylamide by treating acetone cyanhydrin with an excess of concentrated sulfuric acid at a temperature between 90 and 140° C. to form a sulfuric acid salt of methacrylamide, neutralizing the salt with anhydrous ammonia in a water immiscible organic liquid that is a solvent for the unsaturated amide and a non-solvent for ammonium sulfate and separating the precipitated ammonium sulfate by filtration, the steps which comprise recovering the unsaturated amide from solution in the water immiscible organic solvent by extracting the unsaturated amide from solution by an aqueous solution of an aldehyde selected from the group consisting of formaldehyde and acetaldehyde.

2. In a method of preparing methacrylamide by treating acetone cyanhydrin with an excess of concentrated sulfuric acid at a temperature between 90 and 140° C. to form a sulfuric acid salt of methacrylamide, neutralizing the salt with anhydrous ammonia in a hydrocarbon liquid that is a solvent for the unsaturated amide and a non-solvent for ammonium sulfate and separating the precipitated ammonium sulfate by filtration, the steps which comprise recovering the methacrylamide from solution in the hydrocarbon solvent by extracting the methacrylamide with an aqueous solution of an aldehyde selected from the group consisting of formaldehyde and acetaldehyde.

3. The process of claim 1 in which the water extraction is conducted after substantial neutralization of the unsaturated amide and solvent by causing any free ammonia to be evaporated prior to said extraction.

4. The process of claim 1 in which the water used to extract the unsaturated amide contains a water soluble polymerization inhibitor.

References Cited in the file of this patent

UNITED STATES PATENTS

| Number | Name | Date |
|---|---|---|
| 1,581,621 | Trusler | Apr. 20, 1926 |
| 2,026,894 | Hill | Jan. 7, 1936 |
| 2,101,822 | Crawford et al. | Dec. 7, 1937 |
| 2,132,671 | Bauer | Oct. 11, 1938 |
| 2,140,469 | Crawford et al. | Dec. 13, 1938 |
| 2,173,005 | Strain | Sept. 22, 1939 |
| 2,431,468 | Davis | Nov. 25, 1947 |
| 2,628,977 | Gribsby | Feb. 17, 1953 |

FOREIGN PATENTS

| Number | Country | Date |
|---|---|---|
| 345,880 | Italy | Jan. 19, 1937 |
| 827,059 | France | Jan. 18, 1938 |
| 884,564 | France | Apr. 27, 1943 |
| 888,697 | France | Sept. 13, 1943 |